United States Patent

[11] 3,612,351

| [72] | Inventor | Izak Johannes Voullaire<br>Monak, New South Wales, Australia |
|---|---|---|
| [21] | Appl. No. | 36,570 |
| [22] | Filed | May 12, 1970 |
| [45] | Patented | Oct. 12, 1971 |
| [32] | Priority | May 15, 1969 |
| [33] | | Australia |
| [31] | | 55063/69 |

[54] FRUIT FEEDING MEANS OF FRUIT PACKING MACHINES
5 Claims, 2 Drawing Figs.

[52] U.S. Cl. .................................................. 221/296,
221/290, 221/298, 53/246
[51] Int. Cl. ...................................................... B65h 3/30
[50] Field of Search .......................................... 221/298,
296, 290, 93, 292, 294; 53/159, 166, 246, 247

[56] References Cited
UNITED STATES PATENTS
| 2,968,899 | 1/1961 | Holmes .................... | 53/246 X |
|---|---|---|---|
| 3,292,341 | 12/1966 | Frost ........................ | 53/247 X |

*Primary Examiner*—Samuel F. Coleman
*Assistant Examiner*—James M. Slattery
*Attorney*—Sommers & Young ABSTRACT: In a fruit packing machine a downwardly inclined delivery ramp having guides to form fruit fed from a supply bin into a plurality of rows, and a tray having rows of seats to support it in a specified layer formation. The transfer ramp extending downwardly from the lower end of the discharge ramp and includes means to arrange fruit received from the delivery ramp in staggered rows. The transfer ramp may be lowered to a level below the delivery ramp while retaining a downward inclination moved rearwardly over the tray in the direction of the rows of seats to deposit the fruit in the seats.

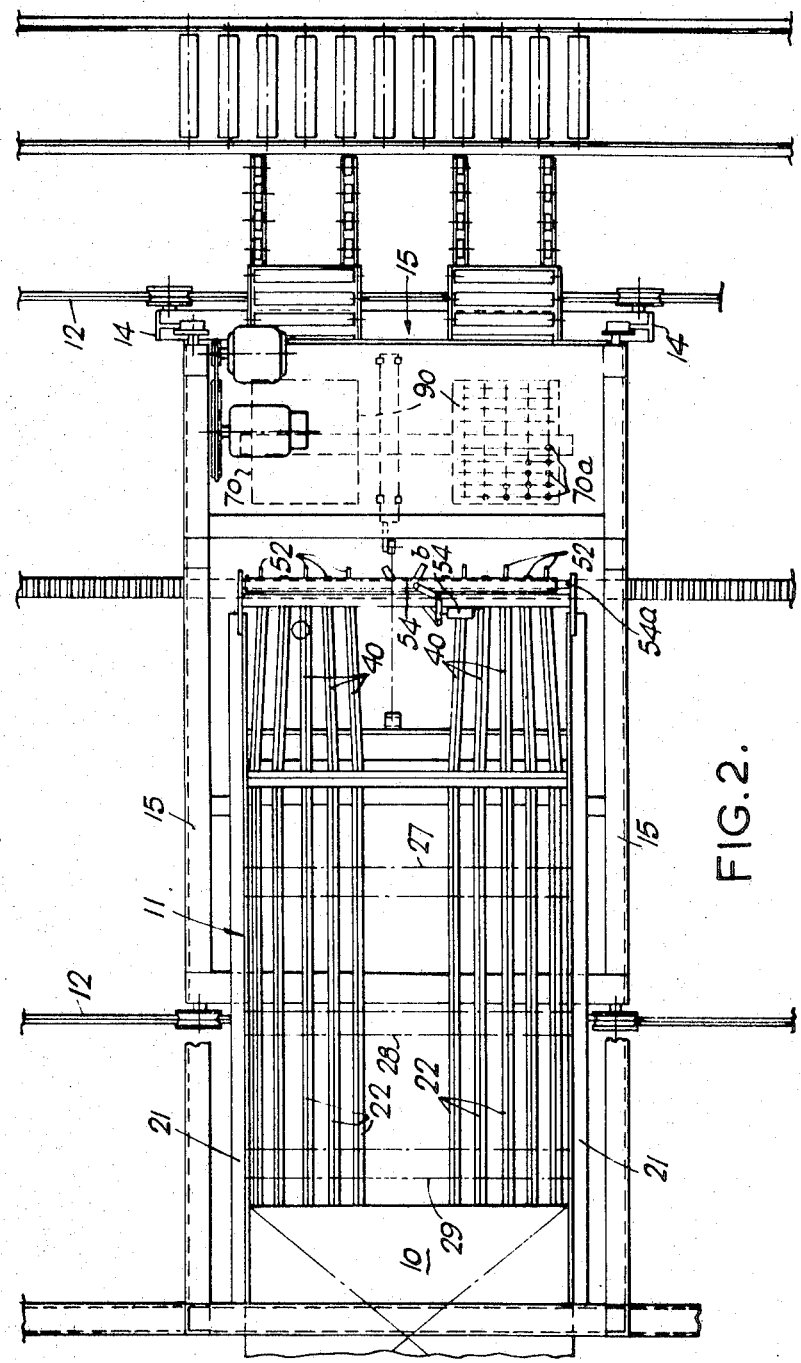

FRUIT FEEDING MEANS OF FRUIT PACKING MACHINES

This invention relates to machines for packing fruit, particularly oranges, into a container, such as a cardboard carton or wooden case, for subsequent storage and/or transport.

In the packing of fruit in containers it is the practice to use a standard sized container for all grades of fruit, and to vary the formation and number of layers of fruit in the container for different grades, in order to ensure that fruit is firmly packed in the container. Each layer of fruit is made up of a number of rows having a given number of pieces of fruit, alternate rows being staggered by an amount approximately equal to half the diameter of a piece of fruit of the particular grade. This layer arrangement is hereinafter referred to as "the specified layer formation." In addition, the corresponding rows of fruit in each layer are staggered by an amount of approximately equal to half the diameter of a piece of fruit in relation to the row immediately above and below it. This specified layer formation is an accepted standard, and results in the voids between the pieces of fruit of one layer forming a seating for the pieces of fruit in the adjoining layer.

This arrangement of the rows and layers results in the fruit being packed firmly in the container to prevent movement of the fruit within the container during subsequent handling, and the elimination of any resultant damage to the fruit.

There is disclosed in my Australian Pat. Nos. 245895 and 266503, apparatus which will receive a prearranged layer of fruit and deposit it in a container. This apparatus provides a plurality of suction cups arranged in rows to correspond to the rows of fruit in each of the two alternate layer formations used in packing one carton of fruit. There have been previously proposed mechanisms for arranging the fruit in the row formation for delivery to the suction cups, but these mechanisms have not been wholly satisfactory in use, and particularly cannot operate at the speed and accuracy necessary for a commercially acceptable fruit packing machine.

It is therefore the principal object of the present invention to provide in a fruit packing machine a mechanism which will effectively arrange the fruit in the desired row formation for delivery to a packing head which mechanism is reliable and effective in operation.

With this object in view there is provided in a fruit packing machine a delivery ramp having guides to form fruit fed from a supply bin into a plurality of rows, a tray having an array of seats to receive fruit and support it in the specified layer formation, a transfer ramp arranged to receive fruit from the delivery ramp and discharge same to the tray in staggered rows, means to selectively meter from the delivery ramp to the transfer ramp in row formation of fruit to constitute one layer, and means to move the lower discharge end of the transfer ramp rearwardly immediately above the tray and in the direction of the rows in the specified layer formation to deposit the fruit in the seats on the tray, the delivery of the fruit to the transfer ramp and the movement of the transfer ramp being effected in sequence.

Conveniently the transfer ramp extends downwardly from the lower end of the discharge ramp and terminating above the plane of the tray, and the transfer ramp includes means to arrange fruit received from the delivery ramp in the staggered rows corresponding to the rows of the specified layer formation. Means may be provided to lower the transfer ramp to a level below the delivery ramp, and to then move the ramp over the tray in the direction of the rows of seats to deposit the fruit therein. The transfer ramp retains a downward inclination when lowered, and the inclination may be increased in this lowered position, to assist in the delivery of the fruit to the tray.

The means to selectively meter the fruit from the delivery ramp may comprise members disposed transversely of the direction of the rows and spaced in said direction a distance to receive therebetween in all row the quantity of fruit constituting one layer. The stop members are movable to permit and interrupt respectively the flow of fruit down the rows, and means are provided to selectively move the stop members to permit discharge of the fruit therebetween and the receipt of further fruit therebetween in sequence.

The mechanism of the present invention progressively organizes the fruit first into continuous rows then separates a quantity of fruit into staggered rows, and finally arranges the separated and staggered rows into the specified layer formation. The movement of the fruit in stages restricts the speed attained so that the fruit does not gain excessive momentum which normally causes difficulties in controlling the movement of the fruit. Further the rearward movement of the transfer ramp, that is with the lower end thereof trailing, over the tray the fruit flows smoothly over the end of the ramp on to the tray.

The invention will be more readily understood from the following description of one practical arrangement of the fruit packing apparatus and of the method of operation of this apparatus. In the drawings:

FIG. 2 is a plan of the packing station and one feed station as shown in FIG. 1.

Figure 1:
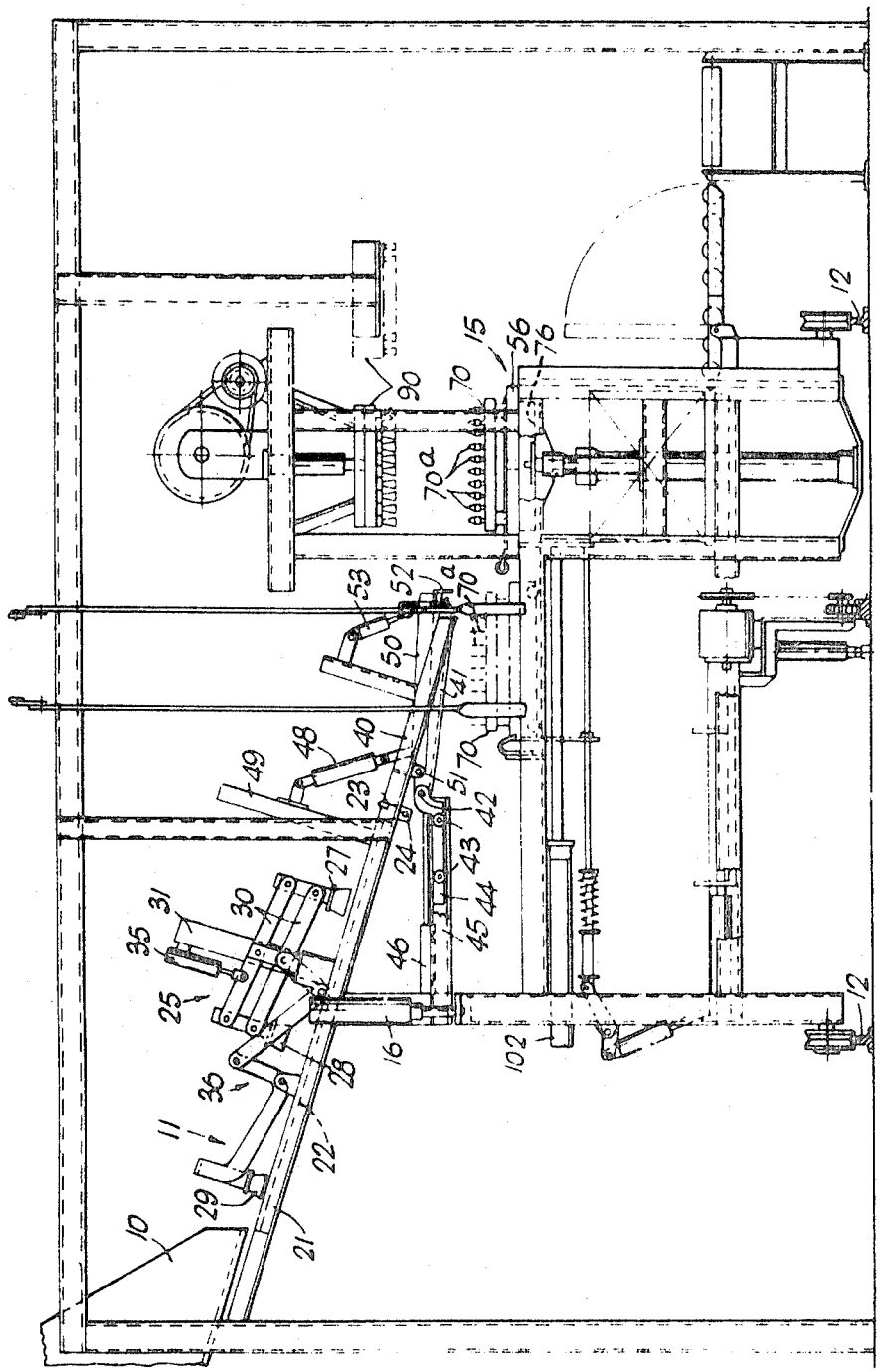
FIG. 1 is a side elevation with a fruit packing machine having a travelling packing station in operative relation with one of a series of feed stations.

The machine illustrated in the drawings is fully described in my copending Australian Pat. Application No. 43356/68. The machine generally comprises a number of hoppers to receive fruit of different grades, mounted in a side-by-side relation with an independent feed mechanism 11 extending forwardly and downwardly from the lower end of each hopper. Mounted on rails 12 extending in a direction transverse to the feeding mechanism, is packing station 15 which can be selectively positioned in operative relation to each feed station.

Pregraded fruit is delivered to the hoppers 10 and each feed mechanism is arranged to deliver fruit in the required row formation, in accordance with its grade, to the packing station 15 for subsequent loading into cartons.

The operation of the feed mechanisms 11 and the packing station 15 are pneumatically controlled to operate in the required sequence, and the automatic coupler 16 is provided to interconnect the air to the feed mechanism and the packing station when the packing station is in the correct operative relation to any selected feed mechanism. Further particulars of the construction and operation of the packing machine are described in my copending application previously referred to.

In the arrangement illustrated the packing station packs two cartons simultaneously, and therefore each feed station has two feeding mechanisms which operate simultaneously. However it is to be understood that the packing station may be constructed to pack any desired number of cartons simultaneously, and the feed stations are similarly arranged. Also for simplicity the following description relates to only one of the feed and packing stations, but it is to be understood that the other stations are of identical construction and operation.

The fruit is packed in the carton in the specified layer formation as previously described and the number of pieces of fruit in each row and layer vary in accordance with the grade of fruit. In one typical example each layer of fruit in the carton comprises five rows of fruit in one direction and nine rows of fruit in the direction at right angles thereto with the fruit in adjoining rows in each direction staggered relative to the fruit in the next row. Accordingly the following description is in regard to a feed station constructed to handle this particular row formation, however it will be appreciated that the same principle of operation and construction can be used for any desired row formation.

Each feed station comprises a frame 21 supporting five parallel feed races 22 constituting a delivery ramp extending from the mouth of the hopper 10 at a downward inclination. At the lower end of each race 22 is a stop flap 23, all flaps being mounted on a common cross-shaft 24. The flaps 23 may be pivoted from an upright position projecting into the race to prevent fruit from moving out of the lower end thereof, to a retracted position out of the race to permit the flow of fruit.

The flow control mechanism 25 is mounted above the races 22 upstream from the lower end of the races, to regulate the flow of fruit down the races. The mechanism includes three crossbars 27, 28 and 29 having lower padded surfaces, which extend transversely across the races and are selectively brought into engagement with the fruit in the races to prevent movement thereof at spaced location down the races. The lower padded crossbar 27 is positioned a distance upwardly from the stop flaps 23 at the lower end of the race so as to engage the fifth piece of fruit from the stop flap in each race. The center and upper crossbars 28 and 29 are spaced a further distance upstream so that each will engage the fifth piece of fruit upwardly from the preceding crossbar.

The lower and center crossbars 27 and 28 are mounted on the parallel links 30 which are pivoted at their respective centers to the support 31. The air cylinder 35 is connected between the support 31 and links 30 to effect angular movement of the latter to selectively raise and lower crossbars 27 and 28. The upper crossbar 29 is carried by the linkage 36 mounted on the feed station frame 21 and connected to the parallel links 30 so that the lower and upper crossbars 27 and 29 are raised and lowered together.

The crossbars are actuated by the air cylinder 35 in sequence with the stop flaps 23 at the lower end of the races, so that when the stop flaps are raised to prevent the passage of fruit from the race the upper and lower crossbars 29 and 27 are raised clear of the fruit and the center crossbar 28 is lowered to engage the fruit. With the crossbars so positioned the pieces of fruit between the center and lower crossbars can flow down the race to be arrested by the stop flaps 23, and further fruit can flow down to the center crossbar. When the stop flaps are retracted to permit the fruit to flow from the races the lower and upper crossbars 27 and 29 are lowered to engage the fruit and prevent further flows down the races to the stop flaps and from the hopper. At the same time the center crossbar is raised so that fruit between the center and rear crossbars can move to a position immediately upstream of the lower crossbar ready for subsequent flow down the races to the stop flaps 23. The control on the air supply to air cylinder 35 is arranged so that the crossbars complete two cycles each time the stop flaps 23 are raised in order to ensure that each race is maintained full of fruit between the stop flaps and the lower crossbar 27.

Extending forwardly and downwardly from each race 22 is the guide chute 40, with the five guide chutes for each series of five races mounted on the common frame 41 to form a transfer ramp. The chute frame extends rearwardly of the chutes 40 below the races 22, and is pivoted at 42 to the carrier 44 for angular movement about an axis transverse to the races. The carrier 44 is supported by rollers 43 on the horizontal tracks 45 mounted on the feed frame 21 for reciprocating movement beneath the races.

The movement of the carrier 44 is effected by the air cylinder 46 connected between the carrier and the feed frame. The pivotal movement of the chute frame is controlled by the air cylinder 48 connected between the chute frame 41 and the pillar 49 on the feed frame 21. The arrangement of the chutes and the pivot axis of the chute frame is such that when the chute frame is pivoted to its lower extent the rearmost portion of the chute is below the level of the forward end of the races 22, so that when the carrier is withdrawn rearwardly the chutes may pass beneath the races.

The stop frame 50, pivotally mounted at 51 to the feed frame 21, extends forwardly to a position above the foremost ends of the chutes and carries a plurality of stop fingers 52, one in line with each chute 40. The stop fingers normally extend into the forward part of the chutes to prevent fruit discharging from the forward end of the chute, and the air cylinder 53 connected between the chute frame 41 and the stop frame 50 effect relative angular movement therebetween to raise and lower the stop fingers.

The stop frame 50 rest freely on the chute frame 41 so that the stop frame 50 pivots downwards with the chute frame 41 to retain the stop fingers in position to prevent the discharge of fruit from the chutes until the chute frame has pivoted to its lowermost position. Also the air cylinders 53 and 48 are arranged to operate so that the stop frame 50 is raised to lift the finger 52 and permit the fruit to flow from the chutes, only after the chute frame 41 has been retracted by the cylinder 46 a distance to deposit two pieces of fruit in each row on the assembly plate 70. As the chute frame is drawn rearwardly the fruit rolls freely down and over the forward ends of the chutes and is deposited in rows on the assembly plate 70, which is described in my copending patent application. After the assembly plate has moved forward into the packing station, the chute frame is again moved forward, the stop frame lowered, and the chute frame raised to align the chutes with the races 22 on the feed frame, to receive a further layer of fruit.

As previously explained the fruit in alternate rows in the carton is staggered by an amount approximately equal to half the diameter of a piece of fruit. This staggered row formation is initially imparted to the fruit in the chutes 40, by arranging the stop fingers 52 in a similarly staggered relation, as best seen in FIG. 2. Thus in each alternate chute the lowermost piece of fruit is displaced upstream half a fruit diameter from the lowermost piece of fruit in the other chutes.

Also as previously explained the row formation in each layer is the reverse of the immediately preceding layer. In order to achieve this change the stop fingers 52 are mounted on the square tube 54 axially slidable on the rod 54a secured to the chute frame 41, transversely of the chutes 40. The position of the fingers 52 is changed after each layer of fruit is delivered to the assembly plate 70 by operation of the air cylinder 54b in sequence with the movement of the chute frame 41.

The assembly plate 70 comprises a base having projecting from the upper surface a plurality of fingers 70a, preferably formed of resilient material, arranged in rows to define seats for the pieces of fruit. The spacing of the fingers is such that the pieces of fruit are each received between four fingers arranged at the corners of a square having a diagonal dimension approximately equal to the diameter of the particular grade of fruit to be received. An example of the finger arrangement is to be found in the Australian Pat. No. 246474.

The table 56 upon which the assembly plates 70 are mounted is slidably supported in the packing station frame 14, and is reciprocated by the air cylinder 102 from a position beneath the chutes 40 in which they receive the fruit (shown in broken outline in FIG. 1), to a forward position beneath the packing heads 90. This movement of the table 56 is effected in sequence with the movement of the chutes 40 and packing heads 90 as described in my copending patent application.

The operation of the apparatus will now be described on the basis that the mobile packing station is located in operative relation with one of the feed stations, and a full supply of fruit is in position in the feed races 22 and the chutes 40.

The apparatus is thus in the condition shown in the drawings.

Upon the operator initiating operation of the apparatus, the table 56 with the assembly plate 70 is drawn rearwardly to the position shown in broken outline in FIG. 1. The air cylinder 48 is then energized to pivot the chute frame 41 downwardly about the axis 42, so that the forward end of the chutes 40 are only slightly above the fingers 70a of the assembly plate. Upon the chute frame 41 reaching this position, the air cylinder 53 is energized to raise the stop frame 50 carrying the fingers 52. At the same time air cylinder 46 is energized to draw the carrier 44 and the lowered chute frame 41 rearwardly. This raising of the stop fingers 52 and rearward movement of the chutes 40, permits the fruit in the chutes to roll therefrom onto the assembly plate, so that the fruit is deposited in the same row and layer formation on the assembly plate as it occupies in the chutes 50.

The table 56 and the assembly plate 70 with the layer of fruit supported thereon, is then moved forwardly by the air cylinder 102 to a position above the platform 76 of the packing station.

After the table 56 has been moved forward, and while the fruit thereon is being presented to the packing head, the chute frame 41 is moved forward by the air cylinder 46, and then pivoted upwardly by the air cylinder 48 to reoccupy its original position as shown in full outline in FIG. 1. The stop frame 50 is also lowered so that the fingers 52 project into the lower end of the chutes 40, and the tube 54 is moved laterally to alternate the position of the stop fingers 52 relative to the chutes, to achieve the desired change in row formation in the next layer of fruit as previously described.

The stops 23 are now lowered to permit a further supply of fruit to flow from the feed races 22 into the chutes 40 as previously described, and then raised again. The feed control mechanism 25 then operates as previously described to allow more fruit to flow down the feed races 22.

It will be noted that the movement of all of the various components are controlled in sequence and appropriate valves are arranged so the movement of one component to a particular position operates a valve to effect the next step in the sequence of operations. The position of these valves and the air lines connecting them to the appropriate cylinders have not been shown for the sake of maintaining the drawings simple, and it will be appreciated that any skilled person could mount the valves appropriately after having read the preceding description of the sequence of operations.

I claim:

1. In a fruit packing machine a delivery ramp having guides to form fruit fed from a supply bin into a plurality of rows, a tray having an array of seats to receive fruit and support it in the specified layer formation, a transfer ramp arranged to receive fruit from the delivery ramp and discharge same to the tray in staggered rows, means to selectively meter from the delivery ramp to the transfer ramp in row formation the quantity of fruit to constitute one layer, and means to move the lower discharge end of the transfer ramp rearwardly over the tray and in the direction of the rows in the specified layer formation to deposit the fruit in the seats on the tray, the delivery of the fruit to the transfer ramp and the movement of the transfer ramp being effected in sequence.

2. In a fruit packing machine a downwardly inclined delivery ramp having guides to form fruit fed from a supply bin into a plurality of rows, a tray having rows of seats to receive fruit and support it in the specified layer formation, a transfer ramp extending downwardly from the lower end of the discharge ramp and terminating above the plane of the tray, the transfer ramp including means to arrange fruit received from the delivery ramp in the staggered rows corresponding to the rows of the specified layer formation, means to selectively meter from the delivery ramp to the transfer ramp the quantity of fruit to constituting one layer, means to lower the transfer ramp to a level below the delivery ramp while retaining a downward inclination thereof with the discharge end immediately above the respective rows of seats on the tray, and means to move the transfer ramp rearwardly over the tray in the direction of the rows of seats to deposit the fruit in the seats, the delivery of the fruit to the transfer ramp and the movement of the transfer ramp being effected in sequence.

3. The combination as claimed in claim 2 wherein the delivery ramp is fixedly mounted on a frame, a carrier mounted on said frame for reciprocatory movement below the delivery ramp, the transfer ramp being pivotally mounted on said carrier for pivotal movement about a horizontal axis disposed transverse to the length of the ramp, means to pivot the transfer ramp relative to the carrier between a position substantially coextensive with the delivery ramp and a position of increased inclination with the upper end beneath the level of the delivery ramp, and the means to move the transfer ramp over the tray to reciprocate the carrier while the transfer ramp is in said increased inclination position.

4. The combination claimed in claim 2 wherein the means to selectively meter the fruit from the delivery ramp comprises stop members disposed transversely of the direction of the rows and spaced in said direction a distance to receive therebetween in all row the quantity of fruit constituting one layer, the stop members being movable to permit and interrupt respectively the flow of fruit down said rows, and means to selectively move the stop members to permit discharge the fruit therebetween and the receipt of further fruit therebetween in sequence.

5. The combination as claimed in claim 2 wherein the means to arrange the fruit in staggered rows on the transfer ramp comprise a plurality of races one race for each row of fruit, a stop member at the lower end of each race mounted for movement in unison to permit or interrupt the flow of fruit in all races, alternate stop members being staggered in relation to the other stop members in the direction of fruit flow, said stop members also being movable to selectively operate in each of two adjoining races.